US012070968B2

(12) United States Patent
Michenaud

(10) Patent No.: US 12,070,968 B2

(45) Date of Patent: Aug. 27, 2024

(54) WRITING INSTRUMENTS

(71) Applicant: SOCIÉTÉ BIC, Clichy (FR)

(72) Inventor: Etienne Michenaud, Clichy (FR)

(73) Assignee: SOCIÉTÉ BIC, Clichy (FR)

( * ) Notice: Subject to any disclaimer, the term of this patent is extended or adjusted under 35 U.S.C. 154(b) by 0 days.

(21) Appl. No.: 18/254,006

(22) PCT Filed: Nov. 22, 2021

(86) PCT No.: PCT/EP2021/082482
§ 371 (c)(1),
(2) Date: May 23, 2023

(87) PCT Pub. No.: WO2022/112164
PCT Pub. Date: Jun. 2, 2022

(65) Prior Publication Data

US 2024/0092116 A1 Mar. 21, 2024

(30) Foreign Application Priority Data

Nov. 24, 2020 (EP) .................................... 20306437

(51) Int. Cl.
*B43K 24/06* (2006.01)
*B43K 24/14* (2006.01)
*B43K 29/02* (2006.01)

(52) U.S. Cl.
CPC .............. *B43K 24/06* (2013.01); *B43K 29/02* (2013.01)

(58) Field of Classification Search
CPC ........ B43K 24/06; B43K 29/02; B43K 24/02; B43K 24/026; B43K 24/10; B43K 24/14; B43K 24/146

(Continued)

(56) References Cited

U.S. PATENT DOCUMENTS

| | | | |
|---|---|---|---|
| 4,221,490 | A | 9/1980 | Malm |
| 5,004,364 | A | 4/1991 | Tomura et al. |

(Continued)

FOREIGN PATENT DOCUMENTS

| | | |
|---|---|---|
| CN | 2346591 Y | 11/1999 |
| CN | 2426418 Y | 4/2001 |

(Continued)

OTHER PUBLICATIONS

International Search Report and Written Opinion issued in International Application No. PCT/EP2021/082482, mailed Nov. 22, 2021.

*Primary Examiner* — David J Walczak

(74) *Attorney, Agent, or Firm* — Bookoff McAndrews, PLLC

(57) ABSTRACT

A writing instrument extending along an axis and comprising a writing tip and an eraser, a first helical cam propelling mechanism configured to move the writing tip along the axis between a retracted position and a protruded position and a second helical cam propelling mechanism configured to move the eraser along the axis between a retracted position and a protruded position, the first helical cam propelling mechanism comprising a first cam follower and a first helical cam, the second helical cam propelling mechanism comprising a second cam follower and a second helical cam, each of the first cam follower, the first helical cam, the second cam follower and the second helical cam being provided on distinct elements.

17 Claims, 6 Drawing Sheets

(58) Field of Classification Search
USPC ............................ 401/29, 30, 32, 52, 16, 20
See application file for complete search history.

(56) References Cited

U.S. PATENT DOCUMENTS

| | | | | |
|---|---|---|---|---|
| 6,979,142 | B1 * | 12/2005 | Chmelar | B43K 21/027 401/65 |
| 7,066,042 | B2 | 6/2006 | Andrews et al. | |
| 7,452,149 | B2 | 11/2008 | Saito | |
| 11,766,887 | B2 * | 9/2023 | Beaucher | B43K 8/003 401/195 |

FOREIGN PATENT DOCUMENTS

| | | | |
|---|---|---|---|
| DE | 2912408 | A1 | 10/1979 |
| FR | 2869834 | A1 | 11/2005 |
| JP | 6312444 | B2 | 4/2018 |
| JP | 2019136947 | A | 8/2019 |

* cited by examiner

WRITING INSTRUMENTS

This is a National Stage Application under 35 U.S.C. § 371 of International Application No. PCT/EP2021/082482, filed Nov. 22, 2021, now published as WO 2022/112164 A2, which claims priority to European Patent application No. 20306437.3, filed Nov. 24, 2020, its content being incorporated herein by reference.

TECHNICAL FIELD

The present disclosure relates to a writing instrument having a retractable writing tip and a retractable eraser disposed at the front end. The writing instrument may be a rotating retractable writing instrument which can protrude and retract a writing tip and an eraser.

BACKGROUND

Traditional rotating retractable writing instruments having a retractable writing tip and a retractable eraser usually have complex mechanism and are not refillable, or not easily refillable. Therefore a need exists to provide a refillable rotating retractable writing instrument having a simpler mechanism, able to retract both the writing tip and the eraser inside the barrel.

Document FR2869834A1 discloses a writing instrument including a barrel, a writing tip, an eraser moving between an extended position and a retracted position, and an eraser mechanism adapted to move the eraser from the retracted position to the extended position.

SUMMARY

In embodiments, a writing instrument comprises a body extending along an axis, the body having a first end and a second end opposed to the first end along the axis, the first end being provided with a writing tip and with an eraser, the writing instrument further comprising a first helical cam propelling mechanism configured to move the writing tip along the axis between a retracted position and a protruded position and a second helical cam propelling mechanism configured to move the eraser along the axis between a retracted position and a protruded position, the first helical cam propelling mechanism comprising a first cam follower and a first helical cam, the second helical cam propelling mechanism comprising a second cam follower and a second helical cam, each of the first cam follower, the first helical cam, the second cam follower and the second helical cam being provided on distinct elements.

The first end is the front end and the second end is the rear end. The writing tip may be a pencil tip, a pen tip, a felt tip, a ballpoint tip or any other element making it possible to write on a substrate or surface.

Both the eraser and the writing tip can axially move with regard to the body. In the retracted position the eraser may be not able to be used for erasing (e.g. the eraser may be concealed within the body). In the protruded position the eraser may be able to be used for erasing (e.g. the eraser may protrude at least in part axially out of the body). In the retracted position, the writing tip may be not able to be used for writing (e.g. the writing tip may be concealed within the body). In the protruded position the writing tip may be used for writing (e.g. the writing tip may protrude at least in part axially out of the body).

Each of the first cam follower, the first helical cam, the second cam follower and the second helical cam is provided on an element which is distinct from any elements having the others of the first cam follower, the first helical cam, the second cam follower and the second helical cam.

Such a writing instrument may have at least one part easily removable for refill, e.g. for replacing the eraser and/or the writing tip and/or a writing body having the writing tip and a reservoir, and/or for ink/lead refill.

In embodiments, the eraser and the writing tip may be at least in part coaxial, and all or part of the eraser may be disposed around all or part of the writing tip.

The eraser may have at least a portion forming a sleeve around the writing tip and sliding along the axis.

In embodiments, the writing tip comprises a writing end, and, when the writing instrument is seen perpendicular to the axis, the writing end may be concealed by the eraser when the eraser is in the protruded position and the writing end may be free from the eraser when the eraser is in the retracted position and the writing tip is in the protruded position.

The writing end is the portion of the writing tip which is applied on a substrate or surface for writing.

The eraser may have at least a portion forming a sleeve around the writing tip and sliding along the axis in order to free the writing end for writing (i.e. when the eraser is in the retracted position and the writing tip is in the protruded position) or to concealed the writing end for erasing (i.e. when the eraser is in the protruded position, the writing tip being in any position). The eraser may have a cylindrical portion extending along the axis. The sleeve of the eraser may have an axial length greater than or equal to the axial length of the portion of the writing tip which protrudes axially out of the body.

In embodiments, the eraser has a distal end, and the distal end may have a frustoconical shape.

In embodiments, the first helical cam propelling mechanism and the second helical cam propelling mechanism may be configured to, when actuated together (for example in a same first rotational direction), move (for example from a starting position) the writing tip from the retracted position to the protruded position first, move the eraser from the retracted position to the protruded position after moving the writing tip from the retracted position to the protruded position, and then move both the writing tip and the eraser back to the retracted position.

For example, the first helical cam propelling mechanism and the second helical cam propelling mechanism may be configured to be only actuated together. For example, the first helical cam propelling mechanism and the second helical cam propelling mechanism may be not actuated from a starting position in a second rotational direction, opposite to the first rotational direction (i.e. the first helical cam propelling mechanism and the second helical cam propelling mechanism may be configured to block their rotation in the second rotational direction from the starting position and to allow their rotation in the first rotational direction from the starting position). In other words, the first helical cam propelling mechanism and the second helical cam propelling mechanism may be configured to be actuated only in the first rotational direction from the starting position. For example the first helical cam propelling mechanism and the second helical cam propelling mechanism may be configured to be actuated in the second rotational direction from any other position than the starting position. For example, when the writing point is in the protruded position, the first helical cam propelling mechanism (and the second helical cam propelling mechanism) may be actuated in the second rotational direction for moving the writing tip from the protruded position toward the retracted position. For example, when the eraser is in the protruded position, the second helical cam propelling mechanism (and the first helical cam propelling mechanism) may be actuated in the second rotational direction for moving the eraser from the protruded position toward the retracted position.

In embodiments, the first helical cam propelling mechanism may be configured to retract the writing tip to an intermediate position between the protruded position and the retracted position, when the eraser is moved from the retracted position to the protruded position.

In embodiments, one of the first cam follower and the first helical cam and one of the second cam follower and the second helical cam may be rotatably coupled.

The first cam follower and the second cam follower may be rotatably coupled, the first cam follower and the second helical cam may be rotatably coupled, the first helical cam and the second cam follower may be rotatably coupled or the first helical cam and the second helical cam may be rotatably coupled.

In embodiments, the body may comprise a first part and a second part, the second part being rotatable around the axis with regard to the first part and axially coupled with the first part, and the second part being rotatably coupled with one of the first cam follower and the first helical cam and one of the second cam follower and the second helical cam.

The first part may be distinct from the second part. The second part may be rotatably coupled with the first cam follower and the second cam follower, the first cam follower and the second helical cam, the first helical cam and the second cam follower or the first helical cam and the second helical cam.

The relative rotation of the first part with regard to the second part may actuate the first helical-cam propelling mechanism and the second helical-cam propelling mechanism, due to which the writing tip and/or the eraser may be moved between the retracted position and the protruded position.

In embodiments, the first part may be snap-fitted with the second part. The first part may be removably or un-removably snap-fitted with the second part.

In embodiments, the eraser may be rotatably coupled with the first part and axially slidable with regard to the first part.

In embodiments, the eraser may be axially coupled with the second part and rotatable with regard to the second part.

In embodiments, the writing instrument may comprise a pusher configured to push the writing tip.

The pusher may push the writing tip directly or indirectly. For example the writing tip may be part of a writing body and the pusher may be configured to push directly the writing body.

In embodiments, the pusher may extend inside the second part and be axially coupled with the second part, rotatably coupled with the eraser, rotatable with regard to the second part and axially slidable with regard to the eraser In embodiments, the second part may comprise a first portion and a second portion, the first portion is mounted with the first part, the second portion being removably coupled with the first portion.

The first portion may be distinct from the second portion. For example, removing the second portion may allow the removal of the writing tip/writing body and/or of the eraser for refill/replacement.

In embodiments, the first portion may be snap-fitted with the first part. The first portion may be removably or un-removably snap-fitted with the first part.

In embodiments, the second portion may be removably snap-fitted or screwed with the first portion.

In embodiments, the first portion may comprise one of the second cam follower and the second helical cam and the second portion may comprise one of the first cam follower and the first helical cam.

For example, the first portion may comprise the second cam follower and the second portion may comprise the first cam follower, the first portion may comprise the second cam follower and the second portion may comprise the first helical cam, the first portion may comprise the second helical cam and the second portion may comprise the first cam follower, or the first portion may comprise the second helical cam and the second portion may comprise the first helical cam.

In embodiments, the second portion may comprise an outer element and an inner element disposed at least in part inside the outer element, the outer element being removably coupled with the first portion, the inner element being rotatable with regard to the outer element and axially coupled with the outer element.

The inner element may be distinct from the outer element. The inner element is at least in part disposed radially inside the outer element. In other words, the outer element is at least in part disposed radially outside the inner element.

In embodiments, the inner element may be snap-fitted with the outer element. The inner element may be removably or un-removably snap-fitted with the outer element.

In embodiments, the inner element may comprise one of the first cam follower and the first helical cam.

The inner element may comprise the first cam follower or the first helical cam.

In embodiments, the inner element may be rotatably coupled with the first portion.

In embodiments, the inner element may be axially slidable with regard to the first portion.

In embodiments, the writing instrument may comprise a first return spring configured to push the writing tip toward one of the retracted position and the protruded position and/or a second return spring configured to push the eraser toward one of the retracted position and the protruded position.

For example, the first cam follower and the first helical cam may be configured to push the writing tip toward the protruded position or the retracted position and the first return spring may be configured to push the writing tip toward the retracted position or the protruded position, respectively. For example, the second cam follower and the second helical cam may be configured to push the eraser toward the protruded position or the retracted position and the second return spring may be configured to push the eraser toward the retracted position or the protruded position, respectively.

In embodiments, the writing tip may be configured to be fed with ink.

In embodiments, the ink may be an erasable ink.

In embodiments, the eraser may be configured to erase the erasable ink.

In embodiments, the erasable ink may be a peelable ink or a thermochromic ink and the eraser may be a peeling body or a friction body, respectively.

A peelable ink is an ink that forms a removable layer on the substrate or surface onto which it is applied. A peeling body is configured to remove or peel a layer of peelable ink. The peeling body may be made of rubber (synthetic or natural), foam, felt, cloth, sponge, gum, silicone, etc.

A thermochromic ink is an ink that may change color as a function of the heat to which it is subjected. A friction body is a body configured to be rubbed over a surface, for example in order to generate heat and to cause a thermochromic ink to change color. The friction body may be made of rubber or elastomer. For example, it may be made of SEBS (styrene-ethylene-butylene-styrene copolymer), SBS (styrene-butadiene-styrene copolymer), EPDM (ethylene-propylene-diene monomer) or any other rubber or elastomer having a high coefficient of friction.

Such writing instruments may be easily refillable.

BRIEF DESCRIPTION OF THE DRAWINGS

The disclosure and its advantages can be better understood by reading the detailed description of various embodiments given as non-limiting examples. The description refers to the accompanying sheets of figures, in which.

DETAILED DESCRIPTION

Figure 1:
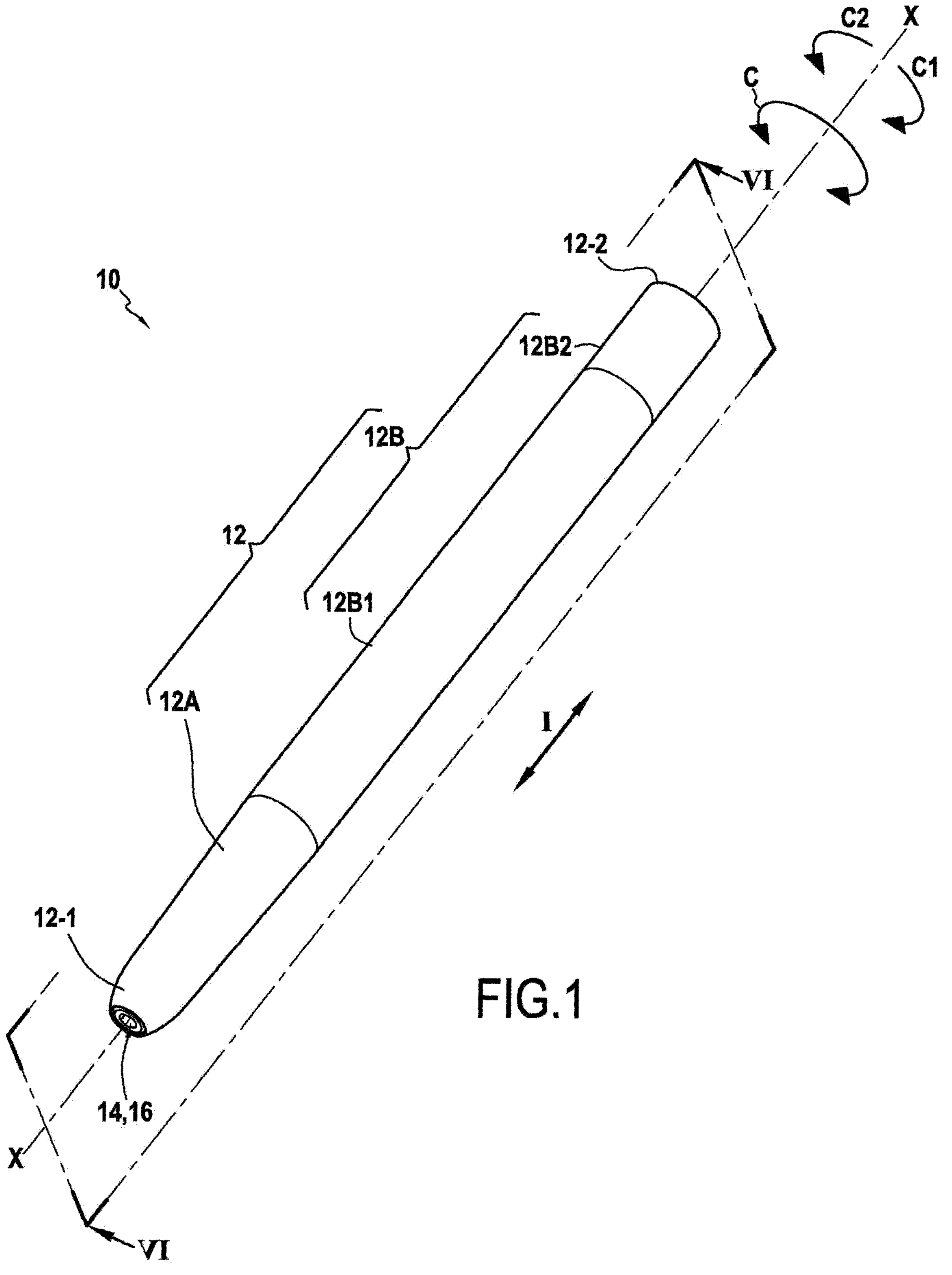
FIG. 1 shows a writing instrument.
Figure 2:
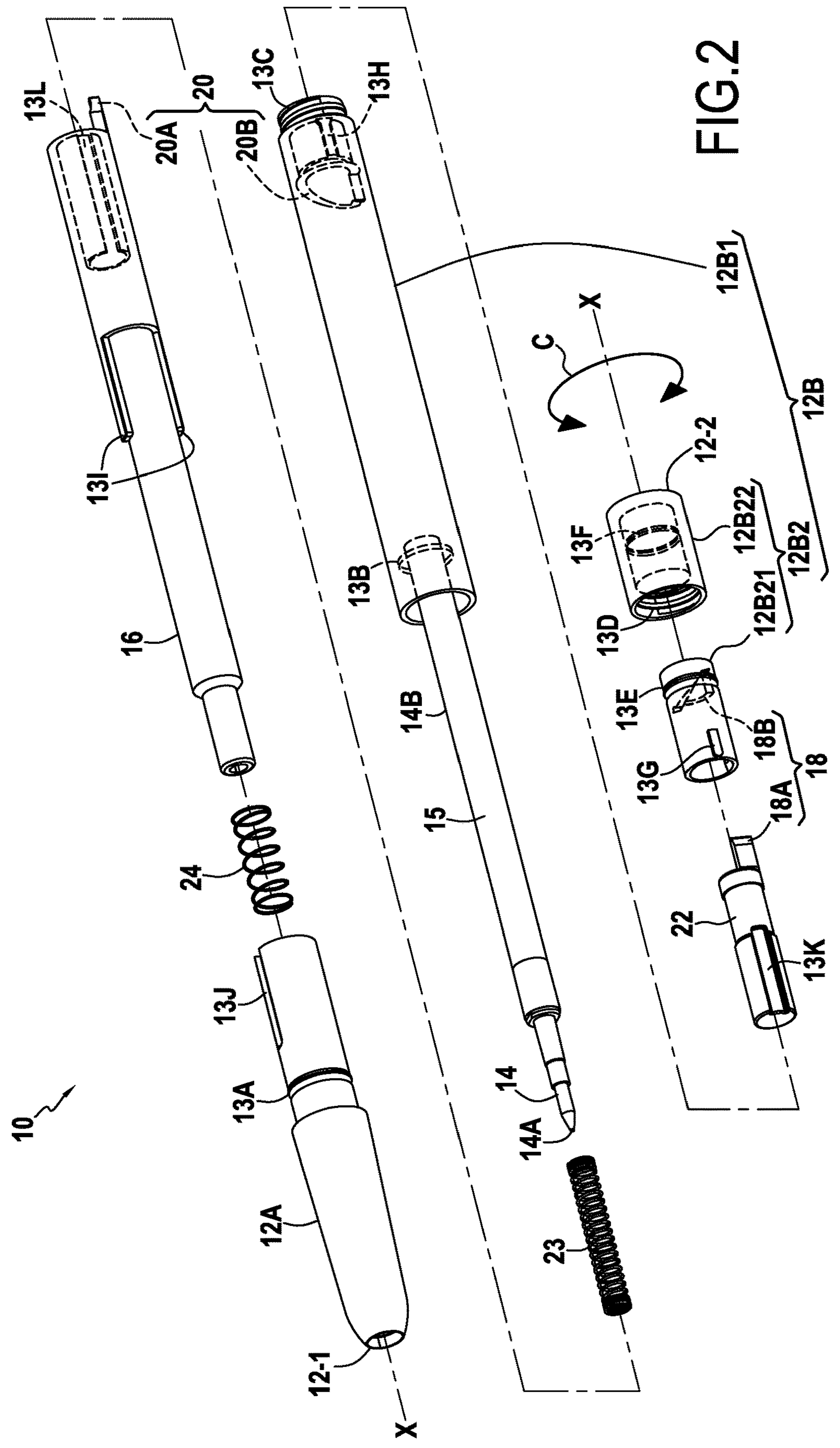
FIG. 2 shows an exploded view of the writing instrument of FIG. 1.

FIGS. 1 and 2 show a writing instrument 10 comprising a body 12 extending along an axis X. The body 12 has a first end (or front end) 12-1 and a second end (or rear end) 12-2 opposed to the first end 12-1 along the axis X. The first end 12-1 is provided with a writing tip 14 and with an eraser 16. Both the writing tip 14 and the eraser 16 are movable along the axis X with regard to the body 12 (see double-arrow I in FIG. 1). The writing instrument 10 comprises a first helical-cam propelling mechanism 18 (see FIG. 2) configured to move the writing tip 14 along the axis X between a retracted position (see FIGS. 1 and 6) and a protruded position (see FIG. 7). The writing instrument 10 comprises a second helical-cam propelling mechanism 20 (see FIG. 2) configured to move the eraser 16 along the axis X between a retracted position (see FIGS. 1 and 6) and a protruded position (see FIG. 8).

The body 12 may comprise a first part 12A and a second part 12B, the second part 12B being rotatable around the axis X with regard to the first part 12A and axially coupled with the first part 12A. The second part 12B may comprise a first portion 12B1 and a second portion 12B2. The first portion 12B1 may be mounted with the first part 12A, the second portion 12B2 being removably coupled with the first portion 12B1. The second portion 12B2 may comprise an outer element 12B22 and an inner element 12B21 disposed at least in part inside the outer element 12B22, the outer element 12B22 being removably coupled with the first portion 12B1, the inner element 12B21 being rotatable with regard to the outer element 12B22 and axially coupled with the outer element 12B22.

The first part 12A and the second part 12B may be assembled by snap fitting, for example via two complementary annular ribs 13A and 13B (or complementary annular rib(s) and/or annular groove(s)). The first portion 12B1 may comprise the annular rib 13B. The second portion 12B2 may be removably screwed with the first portion 12B1 via two complementary threads 13C and 13D. The outer portion 12B22 may comprise the thread 13D. The outer element 12B22 and the inner element 12B21 may be assembled by snap fitting, for example via two complementary annular ribs 13E and 13F (or complementary annular rib(s) and/or annular groove(s)).

When screwed with each other, the first portion 12B1 and the second portion 12B2 may be rotatably and axially coupled. For example, the first portion 12B1 and the second portion 12B2 may be rotatably coupled via complementary axial rib(s) and groove(s) 13G and 13H. The inner element 12B21 may comprise the ribs 13G. The inner element 12B21 may be rotatably coupled with the first portion 12B1 and the outer element 12B22 may be axially coupled with the inner element 12B21 and at least axially coupled with the first portion 12B1 (e.g. the outer element 12B22 may be also rotatably coupled with the first portion 12B1 depending on the screwing torque).

Figure 6:
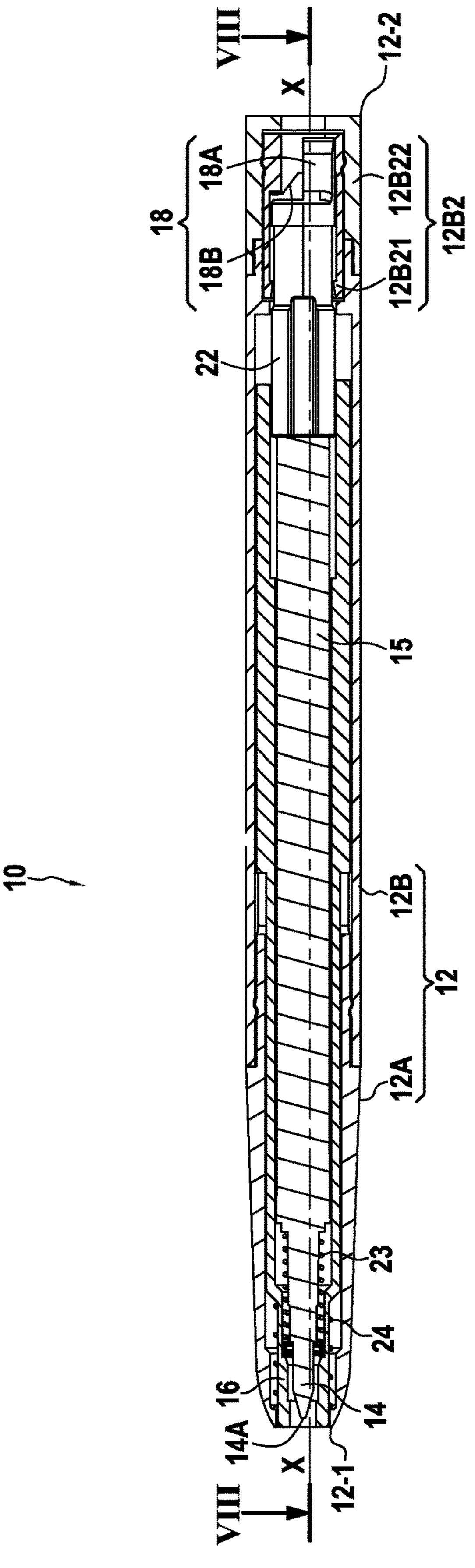
FIG. 6 shows a sectional view of the writing instrument of FIG. 1, in the plane VI of FIG. 1, both the eraser and the writing tip being in the retracted position.

The eraser 16 and the writing tip 14 may be coaxial. The eraser 16 may be disposed around all or part of the writing tip 14 (e.g. depending of their position). The eraser 16 may form a sleeve extending along the axis X and configured to receive therein all or part of the writing tip 14. The writing tip 14 may comprise a writing end 14A. For example, a writing body (or cartridge) 15 may comprise the writing tip 14 and a reservoir 14B configured to feed the writing tip 14 with ink, for example thermochromic ink. The eraser 16 may be a friction body. As shown in FIG. 6, the writing body 15 may be integrally located within the eraser 16 when both the eraser 16 and the writing tip 14 are in the retracted position. When the writing instrument 10 is seen perpendicular to the axis X as in FIGS. 6 to 8, the writing end 14A may be concealed by the eraser 16 when the eraser 16 is in the protruded position (see FIG. 8) and the writing end 14A may free from the eraser 16 when the eraser 16 is in the retracted position and the writing tip 14 is in the protruded position (see FIG. 7).

The first helical cam propelling mechanism 18 comprises a first cam follower 18A and a first helical cam 18B. The second helical cam propelling mechanism 20 comprises a second cam follower 20A and a second helical cam 20B. As seen in FIG. 2, each of the first cam follower 18A, the first helical cam 18B, the second cam follower 20A and the second helical cam 20B are provided on a distinct element. For example, the first cam follower 18A may be provided on a pusher 22, the first helical cam 18B may be provided on the inner element 12B21 of the second portion 12B2 of the second part 12B of the body 12, the second cam follower 20A may be provided on the eraser 16 and the second helical cam 20B may be provided on the first portion 12B1 of the second part 12B of the body 12.

The first helical cam 18B and the second helical cam 20B may be rotatably coupled, for example by rotatably coupling the first portion 12B1 and the second portion 12B2. In the present example, the second part 12B2 may be thus rotatably coupled with the first helical cam 18B and the second helical cam 20B. In the present example, the first portion 12B1 may thus comprise the second helical cam 20B and the second portion 12B2 may thus comprise the first helical cam 18B. The inner element 12B21 may thus comprise the first helical cam 18B.

The writing tip 14 may be coupled with the first helical cam propelling mechanism 18 via the pusher 22. The pusher 22 may be configured to axially push the writing tip 14. The writing tip 14 and the pusher 22 may axially bear against each other, and may form together a movable assembly. The first helical cam propelling mechanism 18 may axially move the writing tip via the pusher 22. The pusher 22 may extend inside the second part 12B. The pusher 22 and the eraser 16 may be rotatably coupled and axially slidable with regard to each other. For example, the pusher 22 and the eraser 16 may be coupled via complementary axial rib(s) and groove(s) 13K and 13L. The pusher 22 may be free to rotate with regard to the second part 12B. The pusher 22 may be axially coupled with the second part 12B via a first return spring 23 and the first helical cam 18B. In the present example, the first helical cam 18B may be configured to push the writing tip 14 from the retracted position to the protruded position and the first return spring 23 may be configured to push the writing tip 14 from the protruded position to the retracted position. In the present example, the first return spring 23 may be a helical compression spring extending axially and having a first distal end bearing against the body 12 and a second distal end, axially opposite to the first distal end, bearing against the writing tip 14 or the writing body 15.

By removing the second portion 12B2, in the present example by unscrewing the outer element 12B22 from the first portion 12B1, the inner element 12B21 having the first helical cam 18B may be removed and free the pusher 22 and the writing tip 14, in this example the writing body 15, for refill or replacement.

The eraser 16 and the first part 12A may be rotatably coupled and slidable with regard to each other along the axis X. For example, the eraser 16 and the first part 12A may be coupled via complementary axial rib(s) and groove(s) 131 and 13J. The pusher 22 and the first part 12A may be rotatably coupled via the eraser 16. The eraser 16 may be free to rotate with regard to the second part 12B. The eraser 16 may be axially coupled with the second part 12B via a second return spring 24 and the second helical cam 20B. In the present example, the second helical cam 20B may be configured to push the eraser 16 from the retracted position to the protruded position and the second return spring 24 may be configured to push the eraser 16 from the protruded position to the retracted position. In the present example, the second return spring 24 may be a helical compression spring extending axially having a first distal end bearing against the body 12 and a second distal end, axially opposite to the first distal end, bearing against the eraser 16.

In the present example, the eraser may be not removable when removing the second portion 12B2

When actuated together, the first helical cam propelling mechanism 18 and the second helical cam propelling mechanism 20 are configured to move the writing tip 14 from the retracted position to the protruded position first (see FIG. 7), move the eraser 16 from the retracted position to the protruded position after moving the writing tip 14 from the retracted position to the protruded position (see FIG. 8), and then move both the writing tip 14 and the eraser 16 back to the retracted position (see FIG. 6).

The first helical cam 18B and the second helical cam 20B may be continuous along the circumferential direction C around the axis X, and may each have an uneven shape. For example, the helical cams 18B and 20B may have, in addition to helical portion(s), flats, bumps or depressions.

Figure 3:
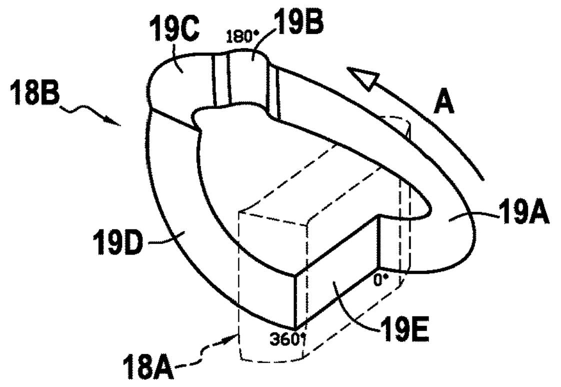
FIG. 3 shows the shape of the first helical cam.
Figure 5:
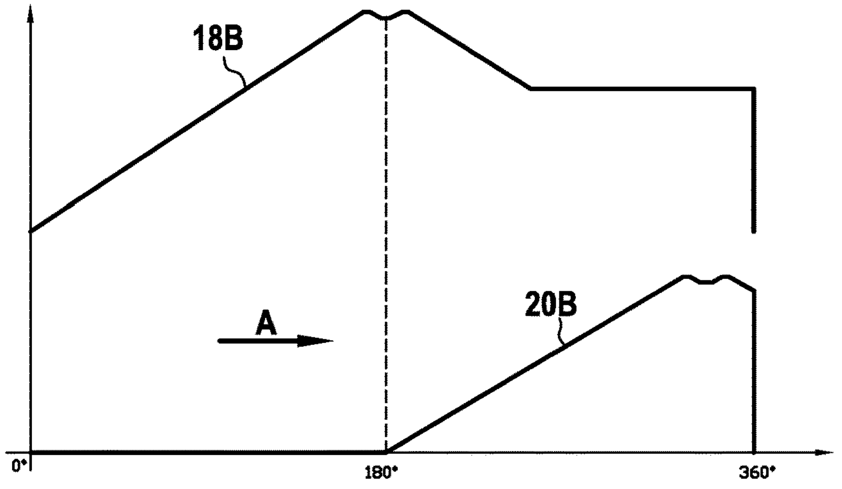
FIG. 5 shows the developed views of the first and the second helical cam.

For example, as shown in FIGS. 3 and 5, the first helical cam 18B may comprise, one after the other, a first helical portion 19A configured to move the writing tip 14 from the retracted position to the protruded position, a depression 19B configured to provide an indication to the user that the writing tip 14 is in the protruded position, a second helical portion 19C configured to move the writing tip 14 from the protruded position to an intermediate position between the protruded position and the retracted position, a first flat portion 19D (perpendicular to the axis X) configured to maintain the writing tip 14 to the intermediate position, and a second flat portion 19E (parallel to the axis X), configured to abruptly move the writing tip 14 from the intermediate position to the retracted position. The first helical portion 19A may extend between a starting position corresponding to an angular position of 0° to an angular position of about 180°, the depression 19B may be disposed at an angular position of about 180°, the second helical portion 19C may extend between an angular position of about 180° and an angular position of about 257°, the first flat portion 19D may extend between an angular position of about 257° and an angular position of about 360° and the second flat portion 19E may be disposed at about 360°.

Figure 4:
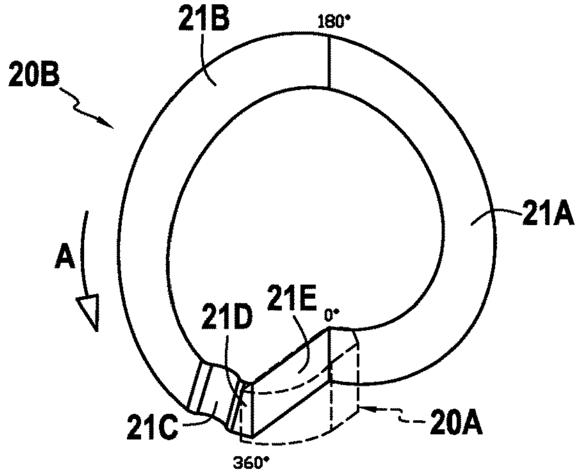
FIG. 4 shows the shape of the second helical cam.

For example, as shown in FIGS. 4 and 5, the second helical cam 20B may comprise, one after the other, a first flat portion 21A (perpendicular to the axis X) configured to maintain the eraser 16 in the retracted position, a first helical portion 21B configured to move the eraser 16 from the retracted position to the protruded position, a depression 21C configured to provide an indication to the user that the eraser 16 is in the protruded position, a second helical portion 21D configured to move the eraser 16 from the protruded position to an intermediate position between the protruded position and the retracted position, and a second flat portion 21E (parallel to the axis X) configured to abruptly move the eraser 16 from the intermediate position to the retracted position. The first flat portion 21A may extend between a starting position corresponding to an angular position of 0° to an angular position of about 180°, the first helical portion 21B may extend between an angular position of about 180° to an angular position of about 345°, the depression 21C may be disposed at an angular position of about 345°, the second helical portion 21D may extend between an angular position of about 345° to an angular position of about 360°, and the second flat portion 21E may be disposed at about 360°.

The starting point of the first helical cam 18B may correspond to the same angular positions as a starting point of the second helical cam 20B. When both the writing tip 14 and the eraser 16 are in the retracted position, in the rest position of the writing instrument (i.e. when the first and second helical cam propelling mechanism are not actuated), the first cam follower 18A may have the same angular position as the starting point of the first helical cam 18B and the second cam follower 20A may have the same angular position as the starting point of the second helical cam 20B. The angular position of the second flat portion 19E of the first helical cam 18B and of the second flat portion 21E of the second helical cam 20B may be the same. In a variant, the second flat portion 19E of the first helical cam 18B and the second flat portion 21E of the second helical cam 20B may have different angular positions.

Figure 7:
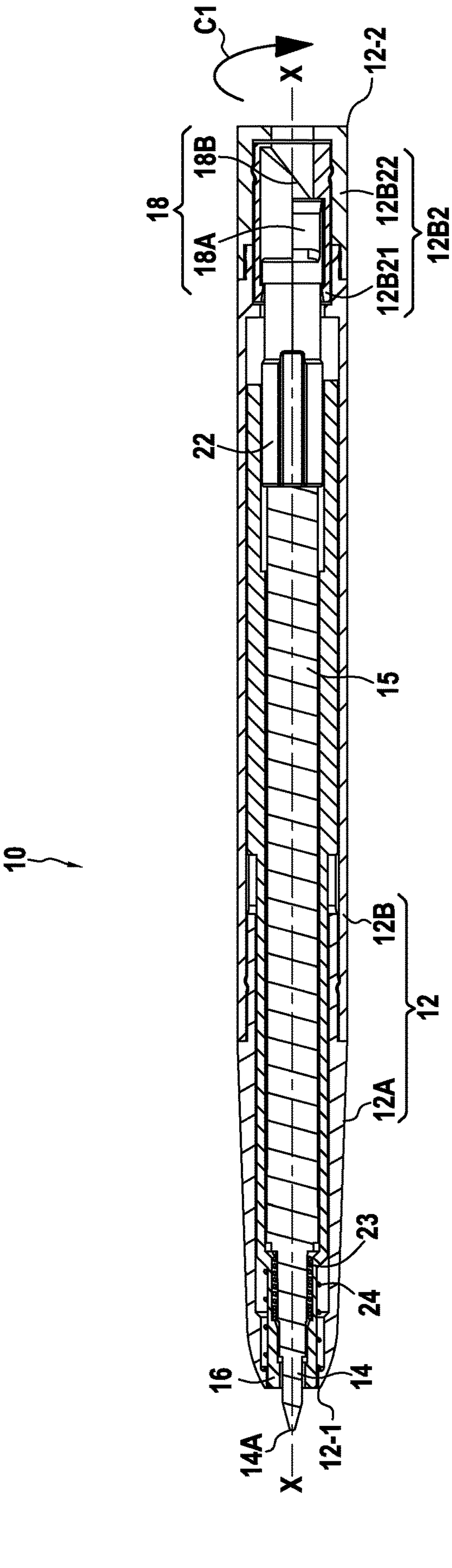
FIG. 7 shows a sectional view of the writing instrument of FIG. 1, in the plane VI of FIG. 1, the eraser being in the retracted position and the writing tip being in the protruded position.
Figure 8:
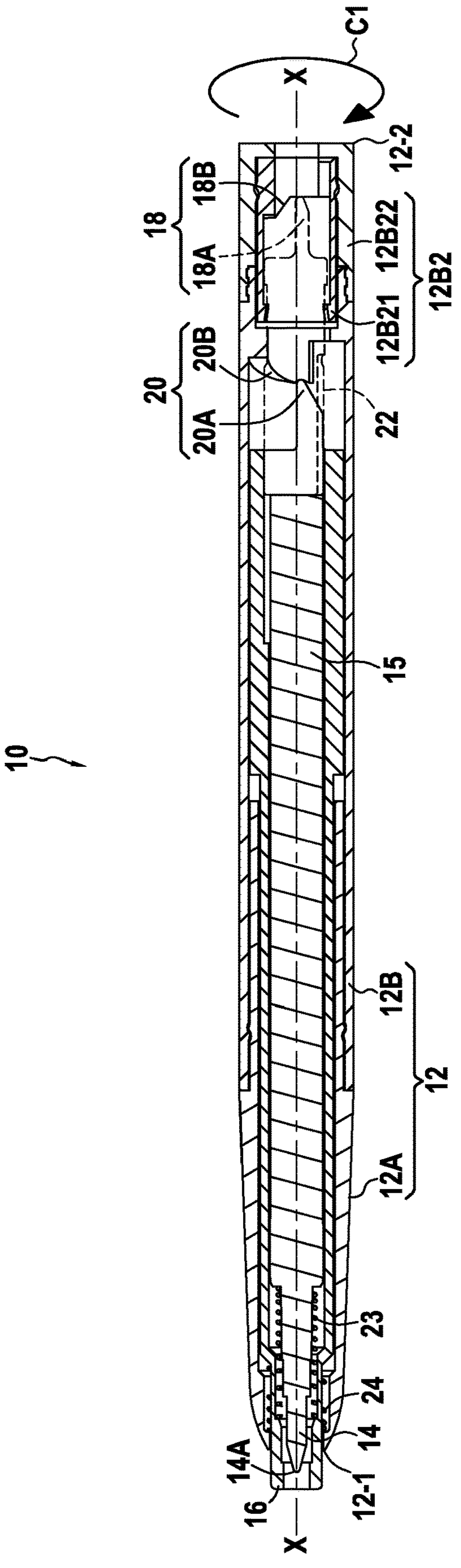
FIG. 8 shows a sectional view of the writing instrument of FIG. 1, in the plane VIII of FIG. 6, both the eraser and the writing tip being in the protruded position.

The movements of the writing tip 14 and the eraser 16 of the present example between the retracted position and the protruded position in now explained with reference to FIGS. 5 to 8. It is noted that the sectional view shown in FIG. 8 is perpendicular to the section view shown in FIGS. 6 and 7 in order to better show the helical cam propelling mechanism 18 and 20. In the present example, the first helical cam 18B and the second helical cam 20B being rotatably coupled and belonging to the second part 12B, they move together with the second part 12B relatively to the first part 12A and to the elements rotatably coupled with the first part 12A when the second part 12B rotates relatively to the first part 12A.

FIG. 6 shows the writing instrument 10 when both the writing tip 14 and the eraser 16 are in the retracted position. The first cam follower 18A and the second cam follower 20A are at the angular position 0° (starting position). In such a position, the second flat portion 19E of the first helical cam 18B and the second flat portion 21E of the second helical cam 20B allow the relative rotation of the second part 12B with regard to the first part 12A only along the first circumferential direction C1 and block the relative rotation of the second part 12B with regard to the first part 12A along the second circumferential direction C2, opposite to the first circumferential direction C1.

Arrow A on FIGS. 3, 4 and 5 represents the relative movements of the first cam follower 18A and of the second cam follower 20A with regard to the first helical cam 18B and to the second helical cam 20B, respectively, when the second part 12B is rotated with regard to the first part 12A in the first circumferential direction C1. When the second part 12B is rotated with regard to the first part 12A in the second circumferential direction C2, the first cam follower 18A and the second cam follower 20A move with regard to the first helical cam 18B and to the second helical cam 20B, respectively, in the direction opposite to arrow A.

When rotating the second part 12B with regard to the first part 12A in the first circumferential direction C1 the first cam follower 18A engages with the first helical portion 19A of the first helical cam 18B, up to engage with the depression 19B, and the second cam follower 20A engages with the first flat portion 21A. The writing tip 14 is thus moved from the retracted position to the protruded position and the eraser 16 rest in the retracted position. Such a configuration is shown in FIG. 7. As seen in FIG. 5, the angular position of the depression 19B of the first helical cam 18B may correspond to end of the first flat portion 21A/beginning of the first helical portion 21B of the second helical cam 20B.

From the position shown in FIG. 7, the second part 12B may be rotated with regard to the first part 12A either in the first direction C1 or in the second direction C2. If rotated in the second direction C2, the writing tip 14 is returned in retracted position and the eraser 16 rests in the retracted position, as shown in FIG. 6. If rotated in the first rotational direction C1, the first cam follower 18A engages first with the second helical portion 19C and then with the first flat portion 19D of the first helical cam 18B, and the second cam follower 20A engages with the first helical portion 21B up to engage with the depression 21C. The writing tip 14 is thus moved from the protruded position to an intermediate position between the protruded position and the retracted position while the eraser 16 is moved from the retracted position to the protruded position. Such a configuration is shown in FIG. 8. As seen in FIG. 5, the angular position of the depression 21C of the second helical cam 20B may correspond to an intermediate position in the first flat portion 19D of the first helical cam 18B.

From the position shown in FIG. 8, the second part 12B may be rotated with regard to the first part 12A either in the first direction C1 or in the second direction C2. If rotated in the second direction C2, the writing tip 14 is returned in protruded position and the eraser 16 is retuned in the retracted position, as shown in FIG. 7. If rotated in the first rotational direction C1, the first cam follower 18A rests engaged with the first flat portion 19D up to the second flat portion 19E and the second cam follower 20A engages with the second helical portion 21D up to the second flat portion 21E. Both the writing tip 14 and the eraser are thus moved to their retracted position, as shown in FIG. 6. The first cam follower 18A and the second cam follower 20A may thus carry out a complete rotation (along arrow A) and return to the starting position 0° with regard to the first helical cam 18B and the second helical cam 20B, respectively. Such a complete rotation in the opposite direction may be not allowed, due to the flat 19E, 21E. In a variant, the flats 19E and 21E may be replaced by helical portion so that complete rotation may be allowed in the two opposite rotations directions.

Although the present disclosure is described with reference to specific examples, it is to be understood that these examples are merely illustrative of the principles and applications of the present disclosure. In particular, individual characteristics of the various embodiments shown and/or mentioned may be combined in additional embodiments. Consequently, the description and the drawings should be considered in a sense that is illustrative rather than restrictive.

It is intended that the specification and the examples be considered as exemplary only, with a true scope of the invention being indicated by the following claims.

The invention claimed is:

1. A writing instrument comprising a body extending along an axis, the body having a first end and a second end opposed to the first end along the axis, the first end being provided with a writing tip and with an eraser, the writing instrument further comprising a first helical cam propelling mechanism configured to move the writing tip along the axis between a retracted position and a protruded position and a second helical cam propelling mechanism configured to move the eraser along the axis between a retracted position and a protruded position, the first helical cam propelling mechanism comprising a first cam follower and a first helical cam, the second helical cam propelling mechanism comprising a second cam follower and a second helical cam, each of the first cam follower, the first helical cam, the second cam follower and the second helical cam being provided on distinct elements, wherein the first helical cam propelling mechanism is configured to retract the writing tip to an intermediate position between the protruded position and the retracted position, when the eraser is moved from the retracted position to the protruded position.

2. The writing instrument according to claim 1, wherein the eraser and the writing tip are at least in part coaxial, and all or part of the eraser is disposed around all or part of the writing tip.

3. The writing instrument according to claim 1, wherein the writing tip comprises a writing end, and, when the writing instrument is seen perpendicular to the axis, the writing end is concealed by the eraser when the eraser is in the protruded position and the writing end is free from the eraser when the eraser is in the retracted position and the writing tip is in the protruded position.

4. The writing instrument according to claim 1, wherein the first helical cam propelling mechanism and the second helical cam propelling mechanism are configured to be actuated and, when actuated together, the first helical cam propelling mechanism and the second cam propelling mechanism are configured to move the writing tip from the retracted position to the protruded position first, move the eraser from the retracted position to the protruded position after moving the writing tip from the retracted position to the protruded position, and then move both the writing tip and the eraser back to the retracted position.

5. The writing instrument according to claim 1, wherein one of the first cam follower and the first helical cam and one of the second cam follower and the second helical cam are rotatably coupled.

6. The writing instrument according to claim 1, wherein the body comprises a first part and a second part, the second part being configured to be rotated around the axis with regard to the first part so as to actuate the first helical cam propelling mechanism and the second helical cam propelling mechanism through relative rotation of the first part with regard to the second part.

7. The writing instrument according to claim 6, wherein the second part is axially coupled with the first part, and the second part is rotatably coupled with one of the first cam follower and the first helical cam and one of the second cam follower and the second helical cam.

8. The writing instrument according to claim 7, wherein the eraser is rotatably coupled with the first part and axially slidable with regard to the first part.

9. The writing instrument according to claim 6, wherein the second part comprises a first portion and a second portion, the first portion is mounted with the first part, the second portion being removably coupled with the first portion.

10. The writing instrument according to claim 9, wherein the first portion comprises one of the second cam follower and the second helical cam and the second portion comprises one of the first cam follower and the first helical cam.

11. The writing instrument according to claim 9, wherein the second portion comprises an outer element and an inner element disposed at least in part inside the outer element, the outer element being removably coupled with the first portion, the inner element being rotatable with regard to the outer element and axially coupled with the outer element.

12. The writing instrument according to claim 11, wherein the inner element comprises one of the first cam follower and the first helical cam.

13. The writing instrument according to claim 11, wherein the inner element is rotatably coupled with the first portion.

14. The writing instrument according to claim 1, comprising a pusher configured to push the writing tip.

15. The writing instrument according to claim 1, comprising a first return spring configured to push the writing tip toward one of the retracted position and the protruded position and/or a second return spring configured to push the eraser toward one of the retracted position and the protruded position.

16. A writing instrument comprising a body extending along an axis, the body having a first end and a second end opposed to the first end along the axis, the first end being provided with a writing tip and with an eraser, the writing instrument further comprising a first helical cam propelling mechanism configured to move the writing tip along the axis between a retracted position and a protruded position and a second helical cam propelling mechanism configured to move the eraser along the axis between a retracted position and a protruded position, the first helical cam propelling mechanism comprising a first cam follower and a first helical cam, the second helical cam propelling mechanism comprising a second cam follower and a second helical cam, each of the first cam follower, the first helical cam, the second cam follower and the second helical cam being provided on distinct elements, wherein the first helical cam propelling mechanism and the second helical cam propelling mechanism are configured to be actuated and, when actuated together, the first helical cam propelling mechanism and the second cam propelling mechanism are configured to move the writing tip from the retracted position to the protruded position first, move the eraser from the retracted position to the protruded position after moving the writing tip from the retracted position to the protruded position, and then move both the writing tip and the eraser back to the retracted position.

17. A writing instrument comprising a body extending along an axis, the body having a first end and a second end opposed to the first end along the axis, the first end being provided with a writing tip and with an eraser, the writing instrument further comprising a first helical cam propelling mechanism configured to move the writing tip along the axis between a retracted position and a protruded position and a second helical cam propelling mechanism configured to move the eraser along the axis between a retracted position and a protruded position, the first helical cam propelling mechanism comprising a first cam follower and a first helical cam, the second helical cam propelling mechanism comprising a second cam follower and a second helical cam, each of the first cam follower, the first helical cam, the second cam follower and the second helical cam being provided on distinct elements, wherein the body comprises a first part and a second part, the second part being configured to be rotated around the axis with regard to the first part so as to actuate the first helical cam propelling mechanism and the second helical cam propelling mechanism through relative rotation of the first part with regard to the second part.

* * * * *